(12) United States Patent
Brar et al.

(10) Patent No.: US 8,489,718 B1
(45) Date of Patent: Jul. 16, 2013

(54) TORROIDAL BACKBONE CONNECTIONS FOR NETWORK DEPLOYMENT

(75) Inventors: Jagwinder Singh Brar, Bellevue, WA (US); Michael David Marr, Monroe, WA (US); Tyson J. Lamoreaux, Seattle, WA (US); Mark N. Kelly, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 445 days.

(21) Appl. No.: 12/783,257

(22) Filed: May 19, 2010

(51) Int. Cl.
*G06F 15/177* (2006.01)

(52) U.S. Cl.
USPC ............................ 709/222; 370/254; 370/360

(58) Field of Classification Search
USPC .................. 370/256, 351, 389; 709/238, 219, 709/239; 712/29
See application file for complete search history.

(56) References Cited

U.S. PATENT DOCUMENTS

| | | | |
|---|---|---|---|
| 6,042,477 A | 3/2000 | Addink | |
| 6,272,548 B1 * | 8/2001 | Cotter et al. | 709/239 |
| 6,430,181 B1 * | 8/2002 | Tuckey | 370/386 |
| 6,567,429 B1 | 5/2003 | DeMartino | |
| 6,980,537 B1 | 12/2005 | Liu | |
| 7,310,673 B2 | 12/2007 | Zhu et al. | |
| 7,633,876 B2 | 12/2009 | Schine | |
| 7,729,291 B2 | 6/2010 | Heino et al. | |
| 7,760,735 B1 | 7/2010 | Chen et al. | |
| 8,107,458 B1 | 1/2012 | Ranganathan et al. | |
| 8,160,063 B2 * | 4/2012 | Maltz et al. | 370/389 |
| 2004/0205339 A1 | 10/2004 | Medin | |
| 2005/0108425 A1 * | 5/2005 | Rabinovitch | 709/238 |
| 2005/0229241 A1 | 10/2005 | Carwile et al. | |
| 2007/0076709 A1 | 4/2007 | Mattson et al. | |
| 2007/0183441 A1 | 8/2007 | Medin | |
| 2008/0147623 A1 | 6/2008 | Swaminathan et al. | |
| 2008/0151863 A1 * | 6/2008 | Lawrence et al. | 370/351 |
| 2010/0049942 A1 * | 2/2010 | Kim et al. | 712/29 |
| 2010/0265849 A1 * | 10/2010 | Harel | 370/256 |
| 2011/0080855 A1 | 4/2011 | Fung | |

* cited by examiner

*Primary Examiner* — Dustin Nguyen
(74) *Attorney, Agent, or Firm* — Novak Druce Connolly Bove + Quigg LLP

(57) ABSTRACT

The efficiency of scaling of a network of computing devices can be improved by grouping highly-connected portions into deployment units wherein devices only have to be aware of other devices in the respective deployment unit. The various deployment units can be connected by a backbone mechanism. In some embodiments, the backbone utilizes a torroidal connection scheme to connect the backbone switches and pass routing protocol information. Host traffic can still utilize connections between tiers, such that standard routing and networking protocols can be utilized. In other embodiments, logical interfaces can be initialized in each backbone switch, such that each switch itself can function as a point backbone. The devices of the various deployment units then can communicate with each other via the point backbones using standard networking and routing protocols.

24 Claims, 8 Drawing Sheets

TORROIDAL BACKBONE CONNECTIONS FOR NETWORK DEPLOYMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In many instances, a customer will require more than one resource, such as a computing device, server, or other computing or processing device, to perform portions of an operation. As the number of customers increases, and the average number of resources per customer increases, there is a corresponding need to increase the available number of resources. In a data center context, this can mean adding many additional racks of servers. In order to accommodate the additional resources, the portion of the data center network that connects those resources to the external network also has to scale accordingly. This scaling often comes with significant expense, and those expenses must be incurred up front, before those additional resources can be offered to customers and thus generate revenue.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing network traffic in a data center, compute cloud, or other such electronic environment. In particular, connection mechanisms are presented that provide for high performance, highly connected networks that can utilize commodity hardware and standard routing protocols, while minimizing the additional number of devices needed to scale the network. In various embodiments, groups of network devices can be divided into logical areas, such as deployment units. Separating portions of the data center into deployment units allows the devices in that unit to only have to be aware of the other devices in that unit. Each deployment unit itself can be a highly connected network, such as a two-tier (e.g., three stage) Clos network, fat tree or high radix connected network, butterfly network (including flattened butterfly), dragonfly network, network with discontiguous tiers, or other highly connected, multi-tier, and/or classical switching network.

Further, the deployment units (or other such network areas) can be connected using one of a plurality of network backbone designs. Rather than using a highly connected backbone that only utilizes connections between tiers, as in a traditional Clos-based approach, a backbone can utilize a torroidal connection scheme, wherein each network switch of the backbone only connects to a portion of the backbone switches, such as four switches in a twelve-switch backbone. The torroidal connections are intra-tier connections, in that they connect devices in the same tier, but the torroidal connections would be used to only pass routing information. Host or network traffic can still be routed via inter-tier connections, or connections between devices in different network tiers, such that standard routing protocols can be utilized.

In other embodiments, the devices of the backbone can have no intra-tier connections to each other. Instead, each of the backbone switches can include one or more logical interfaces, such that each switch can serve as a "point" backbone. A logical interface can comprise, for example, a VLAN interface, loopback interface, or tunneling-based interface, such as GRE, and can be based on any appropriate protocol (including proprietary protocols). Since each of the backbone switches is connected to each of the deployment units, traffic can be routed between hosts of different deployment units via the logical interfaces. Since the connections are all between tiers, standard routing and networking protocols can be utilized.

Figure 1:
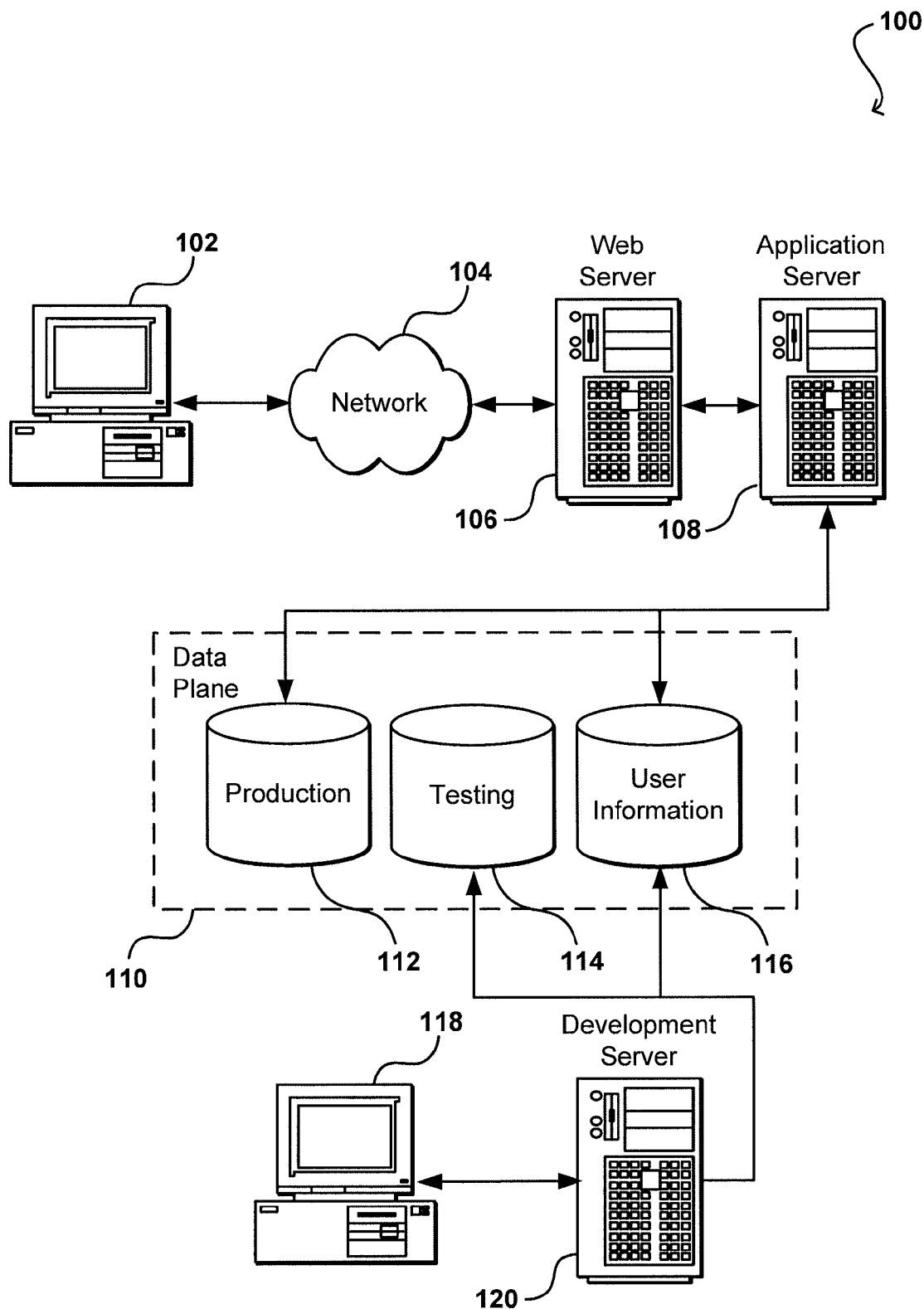
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or computing device as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for an electronic marketplace or compute cloud, for example, wherein multiple hosts might be used to perform tasks such as serving content, executing large-scale computations, or performing any of a number of other such tasks. Some of these hosts may be configured to offer the same functionality, while other servers might be configured to perform at least some different functions. The hosts can be grouped together into clusters or other functional groups for the performance of specific tasks, such as may be provided as part of a data center, cloud computing offering, or processing service. The electronic environment in such cases might include additional components and/or other arrangements, such as those illustrated in the configuration 200 of FIG. 2, discussed in detail below.

Figure 2:
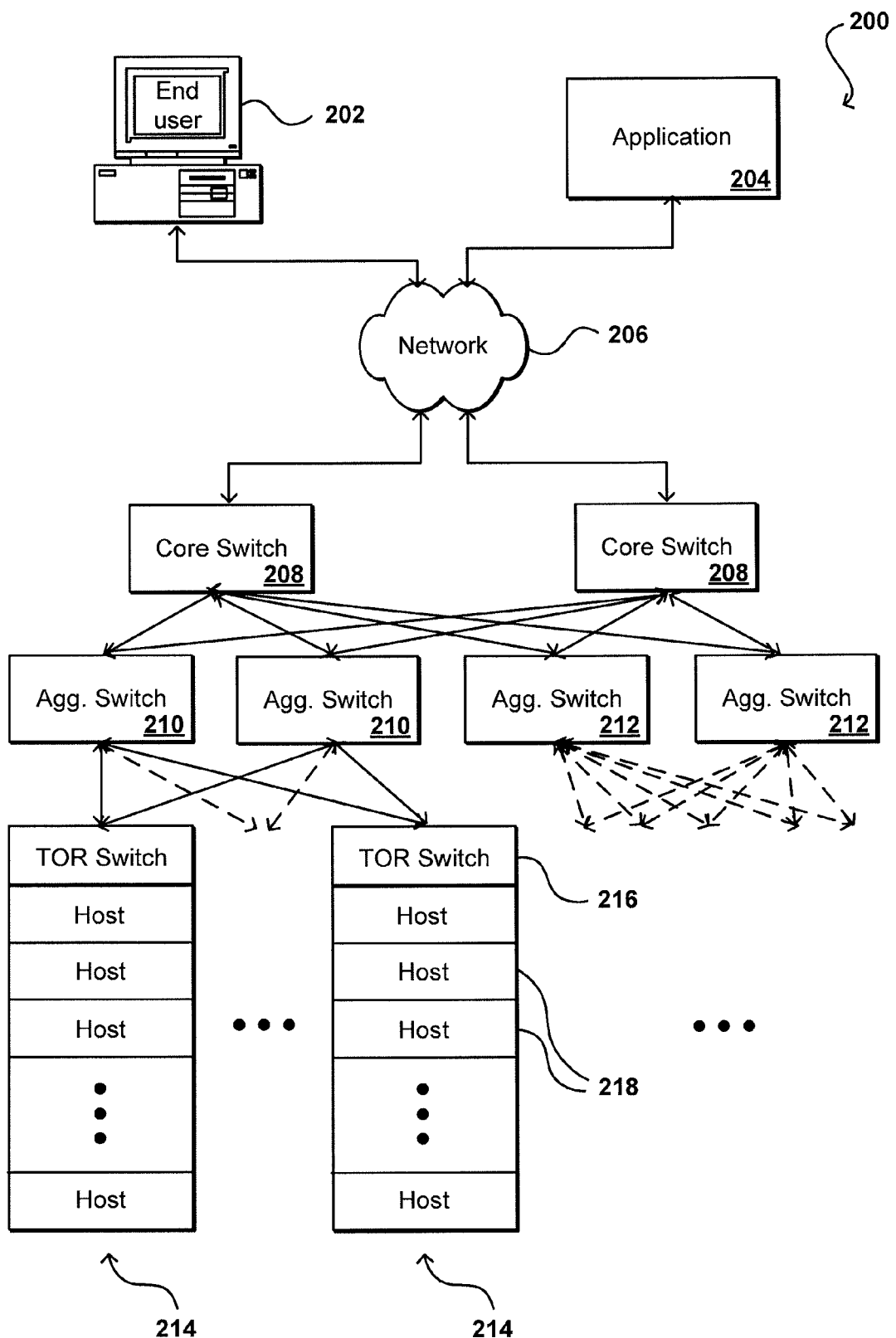
FIG. 2 illustrates an example of a highly connected network design that can be used in accordance with various embodiments.

For example, FIG. 2 illustrates an example configuration 200 that represents a traditional hierarchical network design that can be used to route requests to specific host machines or other such devices, in order to provide users or applications with access to a variety of distributed resources. This example shows a typical design that can be used for a data center, wherein a source such as an end user device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one or the switches experiences a failure or is otherwise unavailable, such that the other device can route traffic for the connected devices. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 3A:
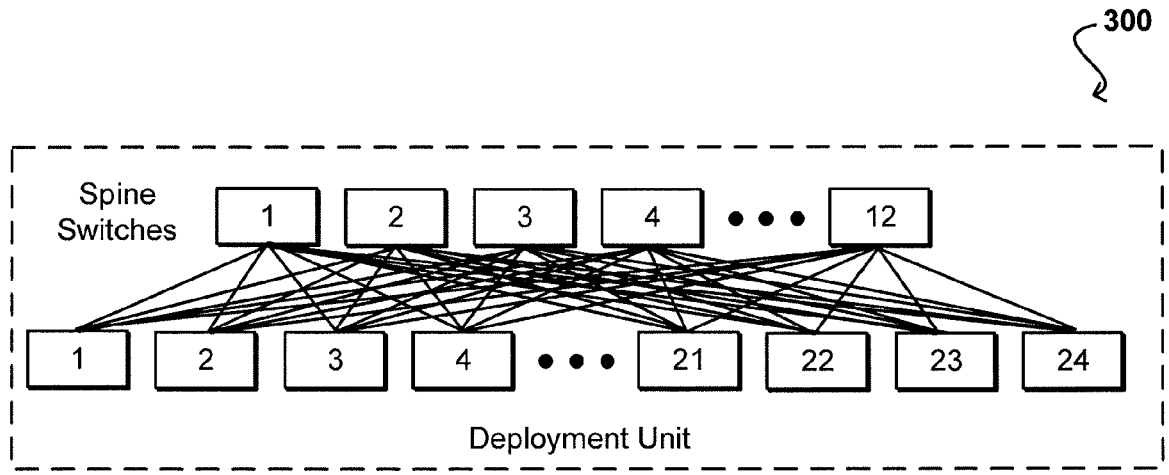
FIGS. 3(a) and 3(b) illustrate views of a Clos network-style deployment unit that can be utilized in accordance with various embodiments.
Figure 3B:
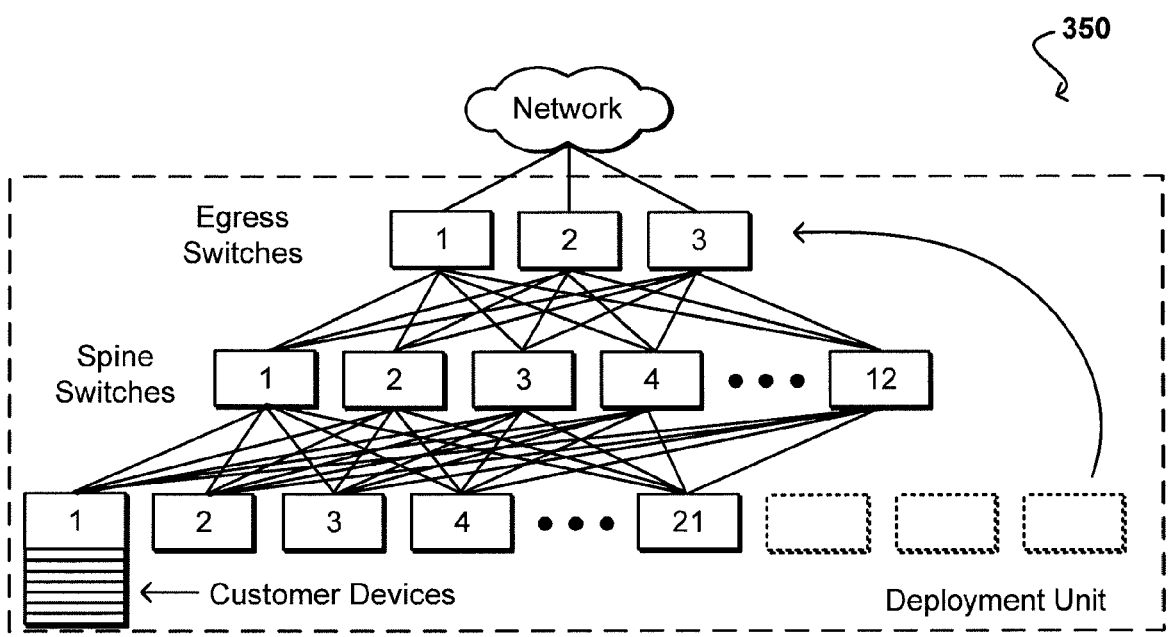

The connectivity approach used for such a network can vary between embodiments. For example, FIGS. 3(a) and 3(b) illustrate a design based on a Clos network approach, wherein there are twenty-one racks each with at least one TOR switch (actual or local), and each of the TOR switches is connected to an array of twelve spine switches, which typically will be located in another physical rack. The array of spine switches corresponds to a "center" stage in a traditional Clos network design. Since there are twelve hosts, there are twelve "up" connections and twelve "down" connections to the spine switches. The design thus provides a high radix network based on a re-arrangeably non-blocking Clos network.

The design presented illustrates a two-tier folded Clos network. As seen in the configuration 300 of FIG. 3(a), there are effectively two layers of switches: a layer of spine switches and a layer of edge switches. Three of the edge switches, however, can be utilized as egress switches which pass data on to the network. FIG. 3(b) thus illustrates a logical arrangement 350 of the switches, herein referred to as a "deployment unit," showing the three edge switches as egress switches which sit at the "top" of the group of switches and pass data "up and out" of the deployment unit. Each of the twelve spine switches can be thought of as having a port out the logical "back" side to one of the three egress switches, but the three switches are simply one of the twenty-four edge servers illustrated in a folded representation. The egress switches simply have the only connections out of the deployment unit, while the remaining edge switches have connections to underlying devices. All traffic into and out of the deployment unit thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the deployment unit have fully meshed connectivity, however, provided by the spine switches. The deployment unit without the egress switches would function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the deployment unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the deployment units can be replicated multiple times within a data center, for example, wherein a Clos-style network effectively manages traffic across all of the deployment units in the data center.

As discussed, traditional hierarchical networks utilize racks which in many cases include about forty servers and one TOR switch per rack. The information from the servers can be routed using one or more large aggregation switches having a relatively large buffer (and forwarding table or other such compenent) capable of handling a significant amount of traffic. These large switches typically are very expensive, such as an order of magnitude more than the cost of a comparable grouping of commodity switches. Commodity switches as used herein generally refer not only to mass-produced, off-the-shelf switches, but also refer to switches built by low cost Just-In-Time (JIT) or on-demand manufacturers, typically using "merchant silicon" or other relatively low-cost materials. Commodity switches typically are relatively simple, although more complex proprietary switches can be included as well. It can be preferable in at least some embodiments to utilize a number of smaller commodity switches in order to reduce the overall cost. Each of these commodity switches typically has a very small buffer, however, which can lead to potential problems with traffic congestion if used to route host traffic. Further, scaling a network of highly connected commodity switches can be difficult and time consuming, particularly when the switches have small buffers such that a large number of the switches are required to be connected together.

In one example, using commodity switches in a design such as that illustrated in FIG. 2 can allow traffic from a large number of host machines to be routed through a deployment unit without the need for large expensive switches. Each TOR switch in such a design can utilize two 2 GbE links (each of which is a pair of redundant 1 GbE connections) up to the aggregation switches. Each of the hosts in the rack can make a 1 GbE connection, such that the host traffic can require a bandwidth of up to 40 GbE. In this case, however, the uplink capacity is 4 GbE resulting in a 10:1 oversubscription. Similarly, there are paired links from the aggregation switches to the pairs of core switches, such that there also can be on the order of a 6:1 oversubscription from an aggregation switch to a core switch. Other variations are possible, however, such as where 10 GbE links are utilized between the aggregation and core switches.

Figure 4:
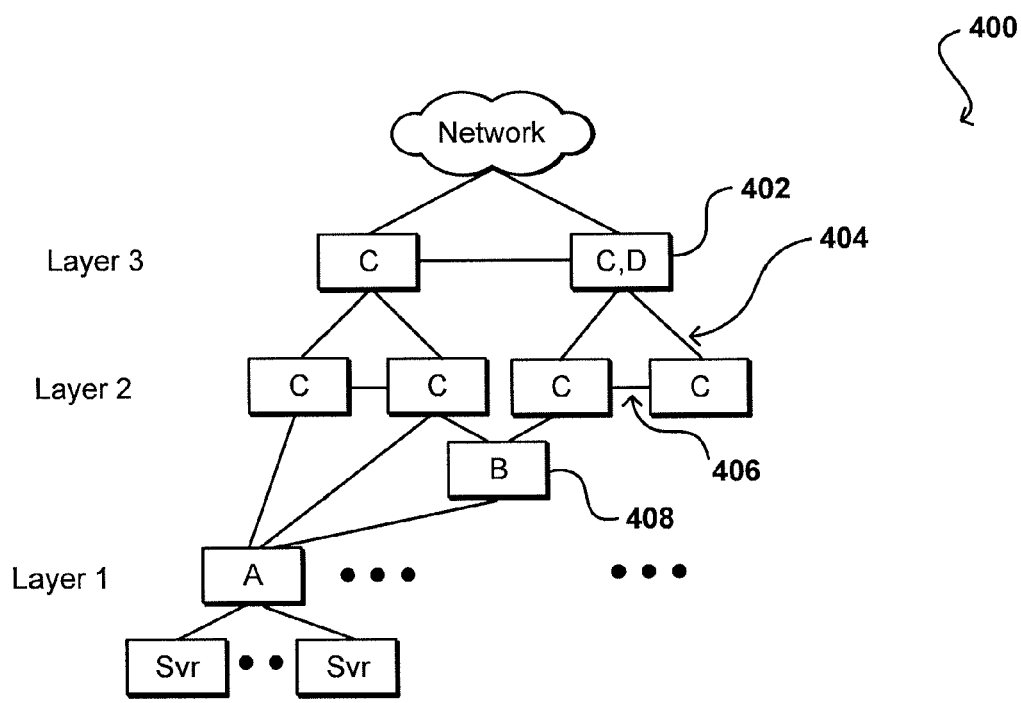
FIG. 4 illustrates an example of an irregular network design.

In certain conventional data center networks, the network layout might utilize a topology that is not regular or symmetric, such as is illustrated in the example configuration 400 of FIG. 4. For example, various different types of devices can be utilized within a layer and/or at different layers, such as device types A, B, C, and D as illustrated. In some cases, a device 402 might be able to function as different devices, either at the same time or at different times. Further, in addition to connections 404 made between layers or tier to route host traffic, there can be intra-tier connections 406 made within layers, enabling host traffic to travel between devices of a single layer. In some cases, there also can be devices 408 in the data center network that sit "between" layers, being connected to two layers but not having the functionality of either layer. Such "irregular" or asymmetric topologies can be complex to implement, maintain, and/or update, and it can be difficult to automate the deployment of such layouts. The deployment can be particularly difficult and time consuming when a customer requests a data center supporting large numbers of hosts, such as 10,000 hosts. As part of the design process, various factors need to be determined and accounted for, including factors such as the desired level of oversubscription at various levels; the type(s), number, and locations of the various racks; the amount of bandwidth desired; and the type of redundancy desired. Even after such a design is generated, however, cost concerns often require adjustments to be made, which can further complicate not only the design process but the design itself.

Such a design process can be simplified to some extent by utilizing a design approach such as a high radix interconnection network design, which utilizes essentially the same type of device at each level, with connections only between devices of different levels, such as is discussed above with respect to FIG. 3(b). An advantage of a high radix network or similar fat tree design is that the network can easily be scaled by adding additional deployment units, each connected using an aggregation fabric such as is described with respect to FIG. 2. A potential downside, however, is that the number of devices needed to scale the deployment units can increase very quickly, which can significantly increase the cost of the network. In an example where a network utilizing large data switches are replaced with a design utilizing commodity switches in a high radix implementation, the number of devices increased from around fifteen switches to on the order of seven hundred to eight hundred switches. Thus, the number of Layer 3 switches that speak the appropriate routing protocol can increase on the order of about fifty times in one embodiment. Further, each of the switches will have to obtain information about all the other switches in the data center, as well as information about all the host devices connected to those switches, such that the amount of information that each switch needs to obtain and process is much higher than in certain conventional designs. Thus, while a high radix interconnection network provides advantages such as ease of scalability and high bandwidth capability, as well as a chance for significant cost savings, the complexity of the routing protocol grows on the order of $n^2$ for a two-tier Clos-based network design, and on the order of $n^4$ for a three-tier Clos-based network, where n is the number of ports on the devices used in each tier. For a large number of hosts, this can provide a significant expenditure and overhead, which can be undesirable in many instances.

Figure 5:
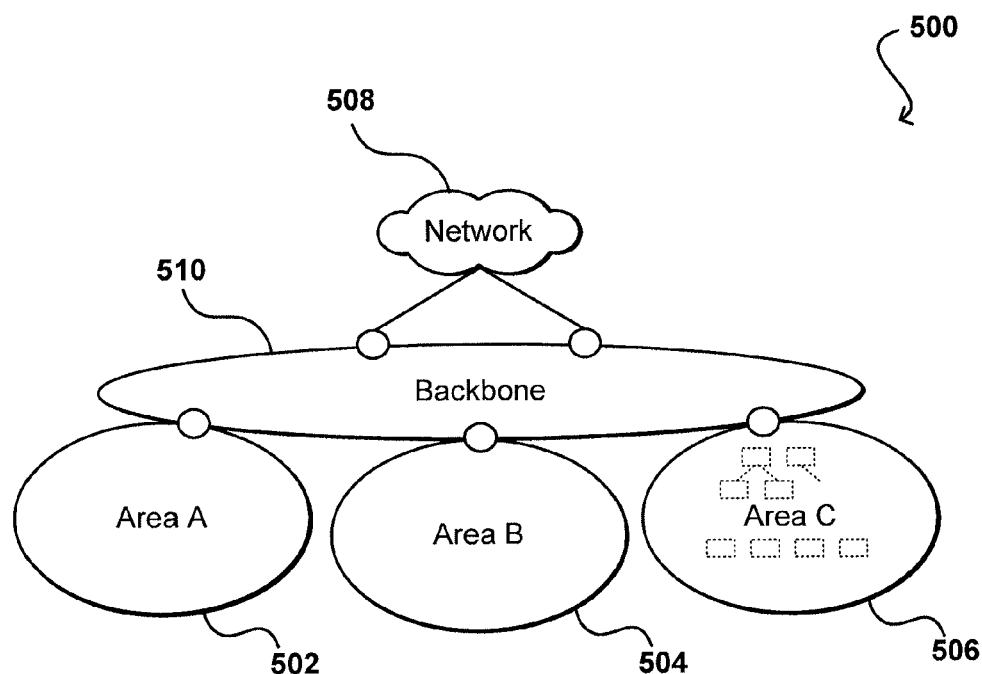
FIG. 5 illustrates an example of a backbone connecting various network areas that can be used in accordance with various embodiments.

One approach that can be used to simplify the scaling process is to utilize a "divide and conquer" approach, wherein devices of the data center network can be divided into various groups or "areas". FIG. 5 illustrates an example configuration 500 utilizing such grouping, wherein groups of devices 502, 504, 506 (such as may each be a two- or three-tier Clos network) are each assigned to a logical "area" or other grouping of the data center network. Protocols such as Open Shortest Path First (OSPF) or Intermediate System to Intermediate System (IS-IS) protocols can be utilized to implement such an area hierarchy. The various areas then can be connected, both to each other and to any external network 508, such as the Internet, utilizing what is commonly referred to as a "backbone" 510. The backbone can be any appropriate network portion, such as a highly connected network or aggregation fabric, for example, including any appropriate number of network switches or other such devices. In some embodiments, the backbone can sit between the areas and the aggregation fabric, etc. Utilizing such a design, smaller numbers of devices (e.g., dozens) maintain information about each other, as devices only need to obtain information about the other devices in their "area" that instead of having to know about all the devices in the data center network, as in conventional approaches discussed previously.

Such a solution may not be optimal in many situations, however, as all the switches in the backbone will typically still be required to connect to each other for routing purposes, such that the switches of the connected backbone can communicate with each other internally within the backbone. In order to provide such communication, routing protocols such as SPF (shortest path first) or Dijkstra protocols can be used as known in the art. The connected backbone will still have to scale as discussed above, however, because these routing protocols have the same problem (e.g., growing on the order of $n^2$ devices). Further, the devices of the backbone must all connect to each other internally within the backbone. At any tier in the backbone the devices do not communicate directly with each other, but instead communicate via another tier, as the Clos (and other high radix) based network designs do not allow for direct (e.g., "horizontal") communication within a tier or layer. In some cases, devices of the backbone must go through two (or more) tiers to communicate with each other. These approaches do not work well when there are a large number of switches, such that it can be desirable to at least partially compartmentalize. Networks such as Clos networks do not provide for intra-tier connections, such that it can be difficult to compartmentalize the switches. If groups of switches can somehow be compartmentalized to form various core areas, other components can instead connect to these core areas.

Figure 6A:
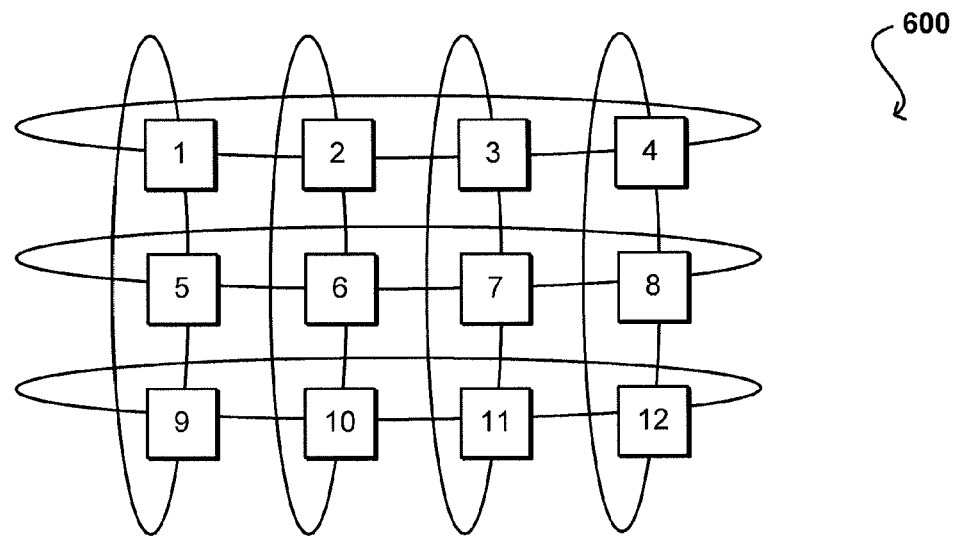
FIGS. 6(a) and 6(b) illustrate an example of a torroidal backbone connection scheme that can be used in accordance with various embodiments.

Systems and methods in accordance with various embodiments overcome these and other deficiencies in conventional network designs by utilizing a "torroidal" design to connect devices in the backbone. Such a design is illustrated logically in the layout 600 of FIG. 6(a). In this example, the backbone consists of twelve devices, such as network switches each having a number of available communication ports. Using such a connection layout, each of the devices can be connected to each of the other devices in the backbone using four ports on each device to provide four "horizontal" connections, or four intra-tier connections within the backbone (tier) between the devices of the backbone. Using a torroidal connection design, up to three devices can fail at a time while still allowing all of the remaining backbone devices to communicate. It will rarely be the case that more than three devices will fail at the same time barring a catastrophic event, and in such a case the actual connection mechanism may not matter depending upon the number of devices taken down. In other embodiments, additional devices can be allowed to fail but these designs can require additional ports and/or links, which can further complicate the design and increase the cost. The torroidal design strikes an advantageous balance in many real-world systems between the complexity and the ability to withstand device failure.

It would be possible to utilize fewer connections, such as two connections for each device where the backbone is connected using a "ring" approach, but such a design can cause problems in the event of a failure of one or two of the devices in the ring, as the remaining devices can be unable to fully communicate with one another which can lead to routing issues as discussed elsewhere herein. In a large data center, it is almost certain that one or two devices will fail at some time, which could result in at least a partial outage of the data center if using a ring-based implementation.

Figure 6B:
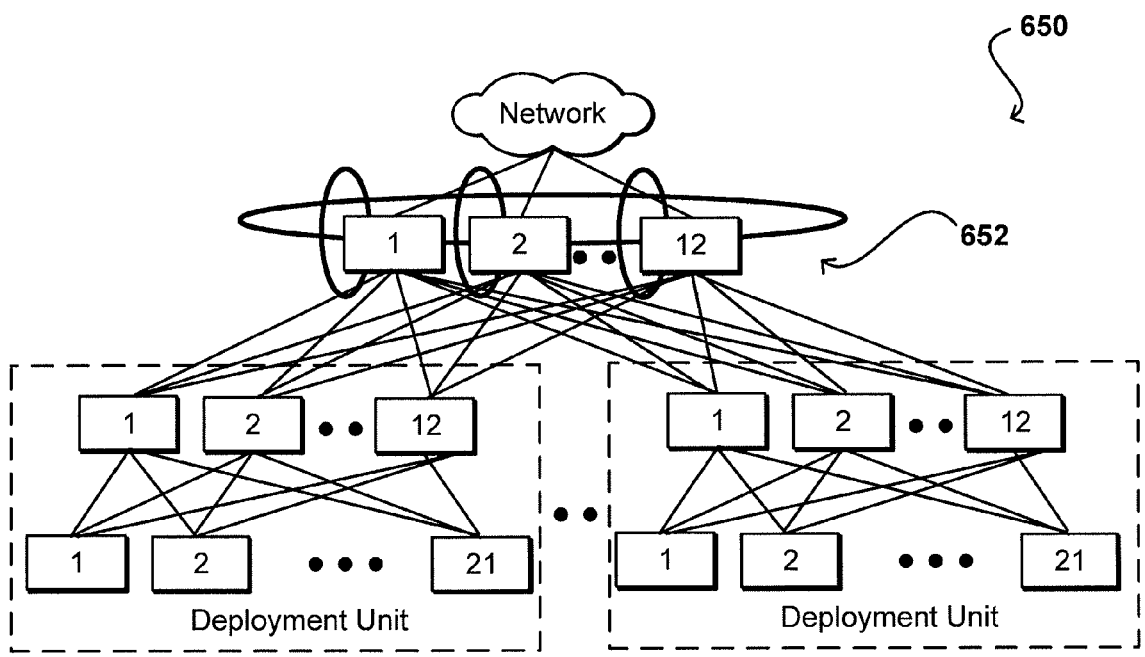

As illustrated in the example configuration 650 of FIG. 6(b), a torroidal design can be used to connect the switches of the backbone, in this case utilizing four ports on each of the twelve backbone devices. In this embodiment, there can be up to six deployment units for the network group, with each device having a number of "high" bandwidth ports (e.g., forty-four 10 GbE ports) and a number of "low" bandwidth ports (e.g., four 1 GbE ports), but it should be understood that the size, types, and numbers can scale accordingly. In this embodiment, each area (described with respect to FIG. 5) that will be connected via the backbone corresponds to a "deployment unit" as described with respect to FIGS. 3(a) and 3(b). In many high radix or other fat tree networks using standard routing protocols, devices only connect to devices in other tiers. The flow of host data can be the same in a network utilizing a backbone and horizontal connections, however, as the flow of host or network data can be restricted to those links or connections between devices of different tiers. For purposes of layering the routing protocol on top of the network, however, intra-tier connections for the routing protocol can be made between the devices of the same backbone tier 652. These horizontal connections within the backbone tier are used only for the routing protocol in this embodiment, to satisfy the requirements of the routing protocol and enable the backbone switches to be aware of each other and synchronize their states within the backbone. The intra-backbone connections are used only for exchanging routing information within the backbone and are not used to carry network traffic because in most embodiments there will always be a better (shorter) path than going through these intra-backbone links. As a result, the intra-backbone links can be substantially lower speed than the rest of the high-radix Clos network links. In other words, cheaper and slower links can be used to interconnect the torroidal backbone.

In embodiments where there are no "low" bandwidth ports, a network architect or other such designer can choose to sacrifice a number (e.g., four) of the standard (or other) ports on each switch to provide the torroidal backbone connectivity. Other variations can be utilized as well. For example, in certain embodiments or for certain protocols it might be desirable to utilize "sideways" or "intra-tier" traffic in a data center, such that the horizontal links can allow for network traffic as well as routing protocol information.

Figure 7:
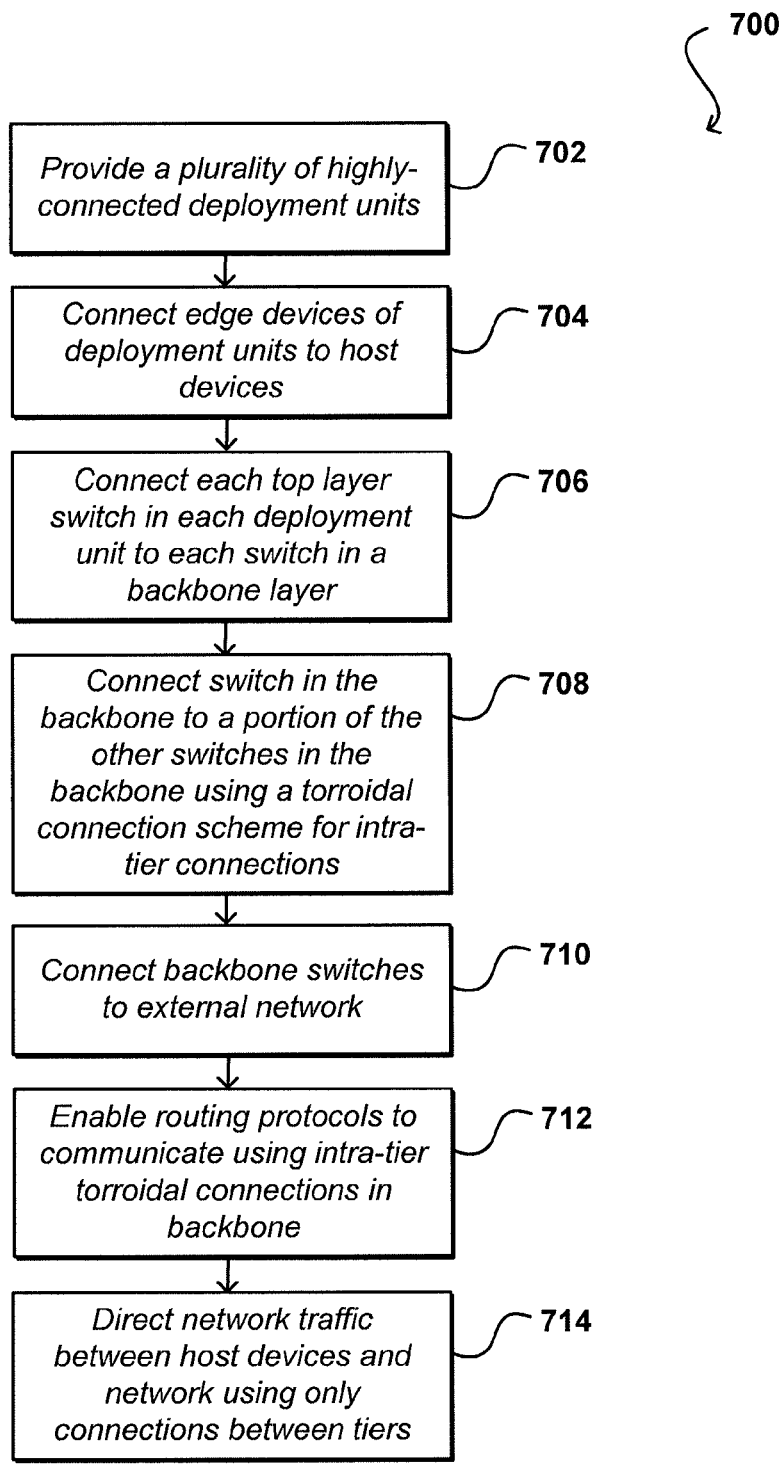
FIG. 7 illustrates an example process for connecting various network areas using a torroidal backbone that can be used in accordance with various embodiments.

FIG. 7 illustrates an example process 700 for connecting deployment units in a data center that can be used in accordance with various embodiments. It should be understood that this process is merely an example, and that fewer, additional, or alternative steps can be performed, and that different steps can be performed in different orders, in parallel, or as part of the same step within the scope of various embodiments. In this example, a plurality of highly-connected deployment units are provided 702, each containing at least a first layer of edge devices and a top layer of network switches. The edge devices (e.g., switches) of each deployment unit are connected to the respective host devices, servers, computing machines, etc. 704. Each top layer switch in each deployment unit is connected to each switch in a backbone layer 706 including a plurality of switches for routing traffic from an external network to each respective deployment unit. It should be understood, that there can be additional components (e.g., an aggregation fabric and/or set of core switches) between the backbone and the external network. There also can be multiple backbones, backbones that scale to different sizes, etc.

Within the backbone itself, each switch can be connected to a portion of the other switches in the backbone using a torroidal connection scheme 708. These intra-tier or "horizontal" connections can be made using lower bandwidth ports on each switch, where available. Further each switch is connected to fewer than all switches, as discussed above, to minimize the number of necessary devices and their influence upon network scaling, etc. Each of the backbone switches can also be connected to the external network 710, using any of a number and type of appropriate devices, connections, etc., as described elsewhere herein. Once the connections are made, the routing protocol information can be communicated using the intra-tier torroidal connections in the backbone 712. All network or host traffic between the host devices and the external network can utilize traditional paths consisting of only links between different tiers 714, without utilizing the torroidal intra-tier backbone connections. As discussed, a number of variations are possible as well within the scope of the various embodiments.

Implementing a torroidal backbone design as discussed above, however, can still require some additional complexity, installation, and maintenance, as well as the associated extra costs. In embodiments where the switches of the backbone do not have low bandwidth ports, such a design can require sacrificing some of the available ports on the backbone devices to dedicate to routing protocols instead of network traffic. Thus, a torroidal backbone design may not be optimal in all embodiments.

Figure 8:
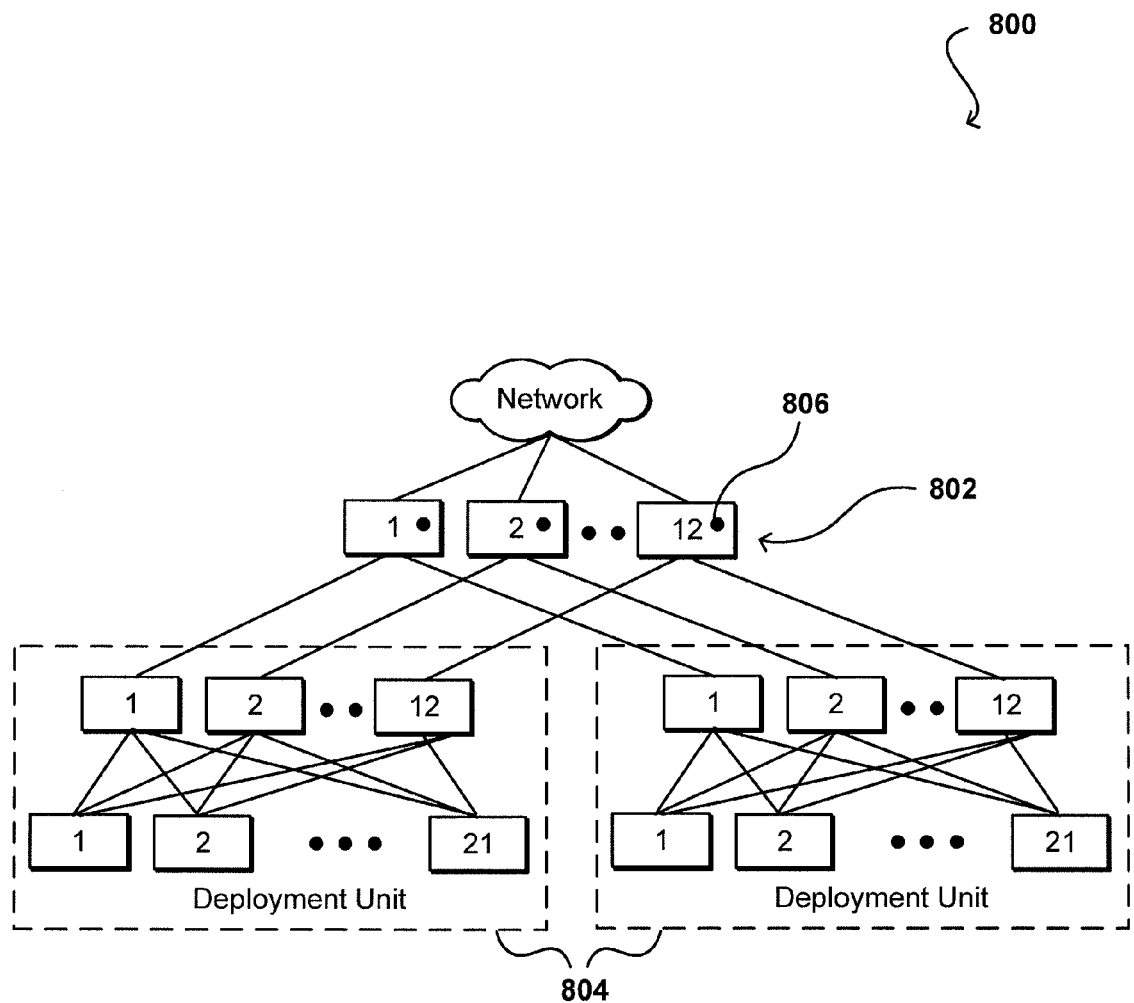
FIG. 8 illustrates an example of a backbone layer utilizing point backbones at a logical interface in each backbone device that can be used in accordance with various embodiments.

Approaches in accordance with various embodiments do away with much of this added complexity and cost by utilizing one or more logical interfaces on each backbone device. For example, the configuration 800 of FIG. 8 illustrates an embodiment wherein there are no physical intra-tier connections in the backbone layer 802, as the network instead only utilizes connections between tiers for purposes including those discussed elsewhere herein. Since the network is highly connected, as discussed previously, each host device in a given deployment unit has a path to each host device in every other deployment unit via the devices of the backbone. Accordingly, there is no need in various embodiments to utilize a physical port for purposes of routing host traffic.

Such an approach can create and utilize a "point" backbone on a logical interface on each switch of the backbone tier 802, such that there is no need to make direct, physical, intra-tier connections between the backbone tier devices. The "point" backbone 806 is illustrated on each switch of the backbone tier 802 as a point, with each of the "points" being connected to each of the corresponding deployment units 804. Each switch then can act as an island in the backbone tier, as in a high radix interconnection or similar fat tree design there is no need for the switches to communicate directly with one another. Each switch can instead utilize a logical interface capable of providing the "point" backbone. The logical interface(s) on each switch is connected to each of the deployment units, such that the deployment units can connect and communicate with each other via any of the switches of the backbone tier. Such a deployment is advantageous over various other designs at least for the reason that no ports of the backbone devices need to be tied up for purposes of the routing protocol, as the port is a logical port. Each device can have any number of logical ports as desired in various embodiments.

The basic physical connectivity when utilizing logical interfaces as point backbones thus is similar to that described with respect to FIGS. 3(a) and 3(b), wherein there are a plurality of deployment units, the links are highly connected, and links occur only between layers. In this design, however, the backbone switches have one or more logical interfaces enabling the deployment units (or "distinct areas" as discussed with respect to FIG. 5) to communicate with each other. The use of the logical interfaces thus can be said to create a new "Area 0" at each switch of the backbone tier that connects the other corresponding areas of the network. Each Area 0 is able to discover connectivity for purposes of routing by communicating with the tiers below, enabling the areas to communicate using standard routing protocols.

Figure 9:
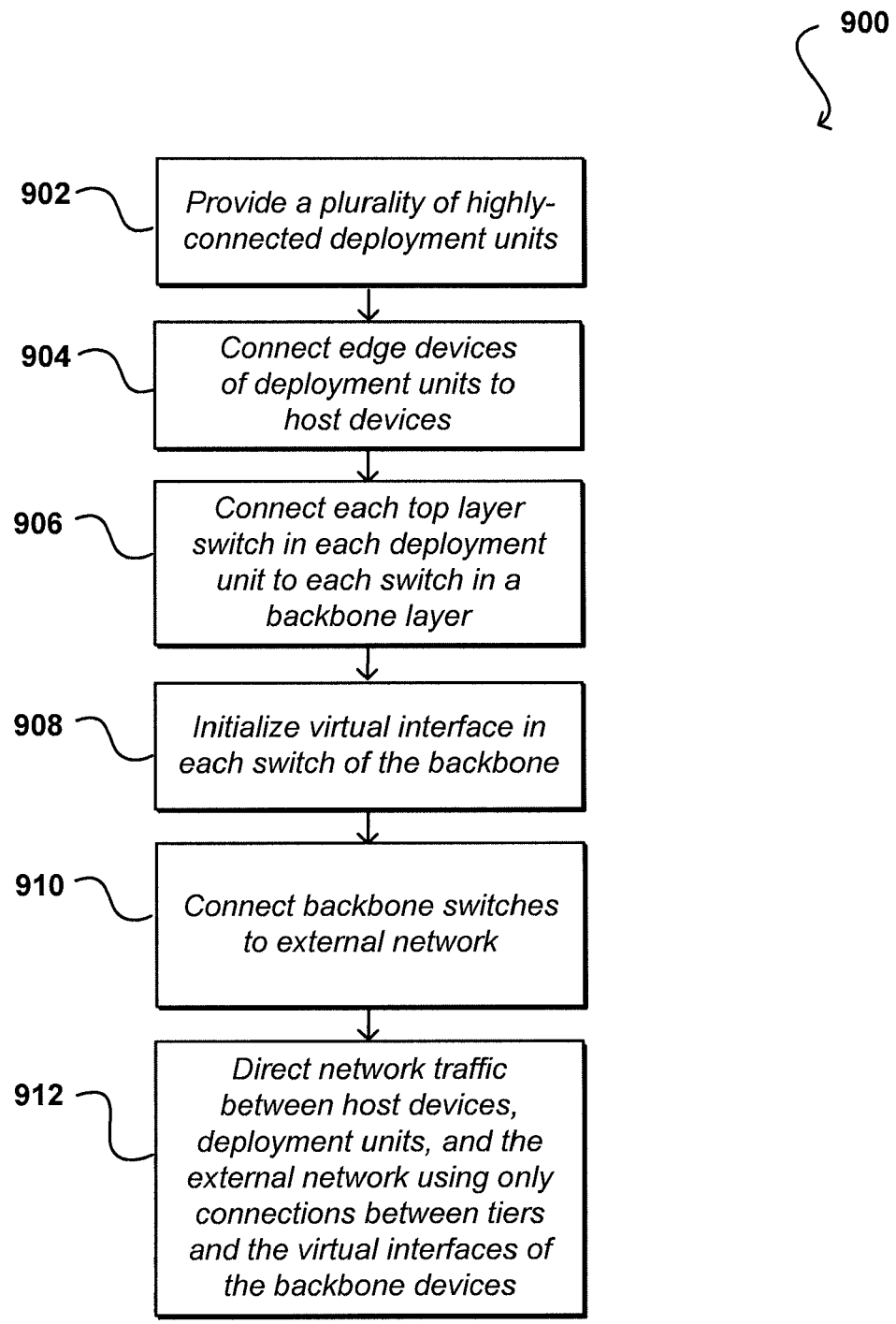
FIG. 9 illustrates an example process for connecting various network areas using a logical interfaces in a backbone layer that can be used in accordance with various embodiments.

FIG. 9 illustrates an example process 900 for connecting deployment units in a data center that can be used in accordance with various embodiments. As with other processes discussed herein, it should be understood that fewer, additional, or alternative steps can be performed, in different orders, in parallel, or as part of the same step within the scope of various embodiments. In this example, a plurality of highly-connected deployment units are provided 902, each containing at least a first layer of edge devices and a top layer of network switches. The edge devices (e.g., switches) of each deployment unit are connected to the respective host devices, servers, computing machines, or other such components 904. Each top layer switch in each deployment unit is connected to each switch in a backbone layer 906, where the backbone layer includes a plurality of switches for routing traffic from an external network to each respective deployment unit. As discussed above, there can be additional components (e.g., an aggregation fabric and/or set of core switches) between the backbone and the external network.

Within the backbone itself, each switch has at least one logical interface created therein 908, which allows one or more top layer switches of each deployment unit to communicate with one or more top layer switches of each other deployment unit connected via the backbone devices. Each of the backbone switches also is connected to the external network 910, using any of a number and type of appropriate devices, connections, etc., as described elsewhere herein. Once the connections are made and the interfaces operable as point backbones, the network or host traffic between the host devices and the external network can utilize traditional paths consisting of only links between different tiers 912, utilizing the logical interfaces to pass between deployment units. As discussed, a number of variations are possible as well within the scope of the various embodiments.

Utilizing logical interfaces enables the network to function as if there are physical connections between portions of the "point" backbone provided by each logical interface for each switch of the backbone tier, as the logical interfaces enable routing information to be transmitted between the areas or deployment units. Thus, an area-based approach can be utilized that helps with scalability, as discussed above, while minimizing the number of additional physical connections that need to be made to enable the network to utilize those areas. Such an approach allows the network to remain highly connected, wherein each "leaf" device is able to communicate with every other "leaf" device without ever having to go "sideways" across a tier or to pass through the core switches. The traffic in this case never passes over the backbone, as the point backbones can connect the different areas without passing host traffic "up" to a higher tier in the network.

It should be pointed out, however, that there might be reasons to utilize a torroidal or similar design instead of utilizing a logical interface-based design. For example, various routing protocols, devices, vendors, or other such sources might not allow for the implementation of such logical interfaces. Further, in some cases the torroidal implementation might provide for improved convergence. For example, when using logical interfaces there are twelve separate Area 0's, or point backbones, while in a torroidal implementation there is a single multi-device Area 0. The characteristics and performance can vary such that different designs might be preferred for various embodiments. Further, variations or combinations of the approaches discussed and suggested herein might be preferred, or at least useful, in other embodiments. Further still, if the network is not sufficiently highly connected, with equivalent peers, for example, the logical interface approach might not work with standard routing protocols. In some embodiments, a torroidal implementation can permit the control plane traffic to be prioritized over the data plane traffic, further improving stability and manageability of the network. The traffic for the control plane can be prioritized at an interface level and/or at various tiers, enabling routing traffic to be prioritized over data traffic in certain embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of connecting computing devices, comprising:
    under control of one or more computer systems configured with executable instructions,
    providing a plurality of deployment units each comprising a first tier of edge switches each connected to each of a second tier of spine switches, each edge switch being further connected to a respective set of computing devices, the edge switches and spine switches being connected using only connections between tiers, wherein each switch in a deployment unit maintains information about other switches located only within the same deployment unit, and wherein only a portion of the edge switches in the deployment unit are configured as egress switches having external connections to one or more devices outside of the deployment unit;
    connecting the plurality of deployment units to an external network using a backbone tier comprising a plurality of backbone switches, connections for network traffic between the computing devices and the external network being only between-tier connections; and
    connecting the plurality of backbone switches using a plurality of connections within the backbone tier, each connection between backbone switches used to transmit routing information for conventional routing protocols, the plurality of backbone switches being connected using a torroidal connection design wherein each of the backbone switches is connected to at most four of the plurality of backbone switches, wherein the backbone switches are enabled to pass routing information upon unavailability of up to three of the backbone switches in the backbone tier.

2. The computer-implemented method of claim 1, wherein the backbone switches are connected using lower bandwidth ports than are used to route network traffic between the computing devices and the external network.

3. The computer-implemented method of claim 1, wherein each deployment unit comprises a Clos network, fat tree network, high radix network, butterfly network, or dragonfly network.

4. A computer-implemented method of connecting computing devices, comprising:
under control of one or more computer systems configured with executable instructions,
grouping switches into a plurality of network areas each comprising a first tier of edge switches each connected to each of a second tier of spine switches, each edge switch comprising ports for connection to a respective set of computing devices, wherein each switch in a network area maintains information about other switches located only within the same network area;
connecting the plurality of network areas to an external network using a backbone tier comprising a plurality of backbone switches; and
connecting the plurality of backbone switches using a plurality of intra-tier connections within the backbone tier, each of the intra-tier connections between backbone switches used to transmit routing information for the plurality of network areas, the plurality of backbone switches being connected using a torroidal connection design wherein each of the backbone switches is connected to only a portion of the plurality of backbone switches.

5. The computer-implemented method of claim 4, wherein each of the plurality of edge switches and the plurality of spine switches is a commodity network switch or application-specific integrated circuit (ASIC).

6. The computer-implemented method of claim 4, wherein the edge switches and spine switches of each network area are connected using only connections between tiers.

7. The computer-implemented method of claim 4, wherein connections for network traffic between the computing devices and the external network are only between-tier connections.

8. The computer-implemented method of claim 4, wherein the backbone switches are connected using a torroidal connection design.

9. The computer-implemented method of claim 4, wherein each edge switch connected to a set of host devices is a top of rack (TOR) switch connected to a plurality of host devices in a network rack.

10. The computer-implemented method of claim 4, wherein a number of spine and edge switches for a first network area is different than a number of spine and edge switches for a second network area.

11. The computer-implemented method of claim 4, wherein the backbone tier is connected to the external network using a high radix interconnection network.

12. The computer-implemented method of claim 4, wherein at least one of the network areas is a Clos network, fat tree network, high radix network, butterfly network, or dragonfly network.

13. A data center, comprising:
a plurality of computing devices each operable to receive a request and perform a computing operation;
a plurality of deployment units each comprising a first tier of edge switches each connected to each of a second tier of spine switches, each edge switch being further connected to a respective set of the plurality of computing devices, the edge switches and spine switches being connected using only connections between tiers, wherein each switch in a deployment unit maintains information about other switches located only within the same deployment unit; and
a backbone tier comprising a plurality of backbone switches, the backbone switches connecting the plurality of deployment units to an external network such that network traffic passes between the computing devices and the external network using only between-tier connections, the plurality of backbone switches being connected to each other using a plurality of intra-tier connections within the backbone tier, each of the intra-tier connections being operable to transmit routing information for the plurality of deployment units between the backbone switches, the plurality of backbone switches being connected to each other using a torroidal connection design wherein each of the backbone switches is connected to a portion of the plurality of backbone switches.

14. The data center of claim 13, wherein each of the backbone switches has a first plurality of higher bandwidth ports and a second plurality of lower bandwidth ports, the network traffic being routed using the higher bandwidth ports and the intra-tier connections being made using the lower bandwidth ports.

15. The data center of claim 13, wherein at least one of the deployment units is a Clos network, fat tree network, high radix network, butterfly network, or dragonfly network.

16. The data center of claim 13, further comprising a highly-connected aggregation fabric connecting the backbone tier to the external network.

17. A system for determining connections for computing devices, comprising:
a processor; and
a memory device including instructions that, when executed by the processor, cause the processor to:
group switches into a plurality of logical areas each comprising a first tier of edge switches each connected to each of a second tier of spine switches, each edge switch comprising ports for connection to a respective set of computing devices wherein each switch in a logical area maintains information about other switches located only within the same logical area;
determine first connections to connect the plurality of logical areas to an external network using a backbone tier comprising a plurality of backbone switches; and
determine second connections to connect the plurality of backbone switches using a plurality of intra-tier connections within the backbone tier, each of the intra-tier connections between backbone switches being used to transmit routing information for the plurality of logical areas, the plurality of backbone switches being connected using a torroidal connection design wherein each of the backbone switches is connected to only a portion of the plurality of backbone switches.

18. The system of claim 17, wherein each of the plurality of edge switches and the plurality of spine switches is a commodity network switch or application-specific integrated circuit (ASIC).

19. The system of claim 17, wherein the backbone switches are connected using a torroidal connection design.

20. The system of claim 17, wherein at least one of the logical areas is a Clos network, fat tree network, high radix network, butterfly network, or dragonfly network.

21. A computer-readable storage medium storing instructions for determining connections for computing devices, the instructions when executed by a processor causing the processor to:
- group switches into a plurality of logical areas each comprising a first tier of edge switches each connected to each of a second tier of spine switches, each edge switch comprising ports for connection to a respective set of computing devices, wherein each switch in a logical area maintains information about other switches located only within the same logical area;
- determine first connections to connect the plurality of logical areas to an external network using a backbone tier comprising a plurality of backbone switches; and
- determine second connections to connect the plurality of backbone switches using a plurality of intra-tier connections within the backbone tier, each of the intra-tier connections between backbone switches being used to transmit routing information for the plurality of logical areas, the plurality of backbone switches being connected using a torroidal connection design wherein each of the backbone switches is connected to only a portion of the plurality of backbone switches.

22. The computer-readable storage medium of claim 21, wherein each of the plurality of edge switches and the plurality of spine switches is a commodity network switch or application-specific integrated circuit (ASIC).

23. The computer-readable storage medium of claim 21, wherein the backbone switches are connected using a torroidal connection design.

24. The computer-readable storage medium of claim 21, wherein at least one of the logical areas is a Clos network, fat tree network, high radix network, butterfly network, or dragonfly network.

* * * * *